Patented Jan. 23, 1951

2,539,329

UNITED STATES PATENT OFFICE 2,539,329

PROCESS OF COATING AN INORGANIC FABRIC WITH POLYTETRAFLUOROETHYLENE AND PRODUCT RESULTING THEREFROM

Philip Francis Sanders, Lima, Pa., assignor to E. I. du Pont de Nemours and Company, Wilmington, Del., a corporation of Delaware No Drawing. Application April 9, 1949, Serial No. 86,606

6 Claims. (Cl. 117—65)

This invention relates to coated or impregnated substrates and a method of producing same, and, more particularly, to fabric coated or impregnated with polytetrafluoroethylene.

Polytetrafluoroethylene is a relatively new polymeric film-forming material which has several outstanding properties, such as insolubility in all known solvents, resistance to very high temperatures which will adversely affect all other known film-forming substances, resistance to abrasion, and unusual electrical properties; e. g., high dielectric strength, high insulation resistance, and extremely low dielectric losses. The insolubility of the polytetrafluoroethylene, however, limits its mode of application as a coating or impregnant where liquid coating compositions have been employed heretofore.

Copending application Serial No. 713,385, filed November 30, 1946, by Malcolm M. Renfrew, and now Patent No. 2,534,058, discloses a method of preparing dilute aqueous suspensoids of colloidal polytetrafluoroethylene for use as coating compositions. Copending application Serial No. 783,389, filed October 31, 1947, by Carol K. Ikeda, discloses a method of concentrating the dilute suspensoids of polytetrafluoroethylene, by means of electrodecantation, to make them more useful as coating compositions.

It is possible to apply the last-mentioned concentrated aqueous suspensoids to surfaces by many of the same methods used for conventional coating compositions. The particles of polytetrafluoroethylene will adhere to the surfaces and to each other upon evaporation of the suspending medium due to the physical attraction of the particles to the surfaces and to each other, with or without heating.

However, in coating surfaces or impregnating fabrics with the concentrated aqueous suspensoid, it has been found that, on drying or evaporation of the suspending medium, microscopic cracks (referred to as "mud cracks") are formed in the coating due to its change in volume. The thicker the film, the greater is the tendency for larger cracks to form therein. It is possible to build up a continuous thick coat by applying a large number of very thin coats (less than about .7 mil thick) which do not develop "mud cracks" on drying, but this is not an economical method of achieving the desired result.

A primary object of this invention is to provide a process of coating substrates with an aqueous suspensoid of polytetrafluoroethylene. A further object is to provide polytetrafluoroethylene films free from "mud cracks" or surface checking and deposited from relatively thick coats. A still further object is to provide continuous lengths of glass fabric, asbestos fabric, and metal (woven wire) fabric coated or impregnated with polytetrafluoroethylene free from "mud cracks" or surface checking and having good electrical properties. Other objects will be apparent as the description proceeds.

These objects are accomplished by:

(1) Applying a relatively thick coat of an aqueous suspensoid of polytetrafluoroethylene to a substrate;

(2) Evaporating the suspending medium;

(3) Rolling or friction calendering the coated substrate on unheated or moderately heated rollers; and (4) Heating the coated substrate to at least the fusion temperature of the polytetrafluoroethylene.

During the evaporation step (2), numerous "mud cracks" (surface checking) are formed in the coating. The rolling in step (3) closes these "mud cracks," and the final step (4) of heating to at least the fusion temperature of polytetrafluoroethylene coalesces the particles and forms a strong, adherent film which will not crack when flexed sharply or creased.

If desired, step (4) may be deferred until the substrate is in its place of ultimate use. For instance, a glass fabric may be processed as outlined in (1), (2), and (3) above, slit into strips, wrapped around a wire conductor, and then subjected to a temperature which will fuse the polytetrafluoroethylene particles as outlined in (4).

In view of polytetrafluoroethylene's solid-phase transition or fusion temperature of 621° F., it was surprising and entirely unexpected that the filling-in of the "mud cracks" formed in the coating during its drying could be accomplished by the rolling or calendering operation at a temperature below 621° F. It is believed that the polytetrafluoroethylene particles, being of unctuous character, slide over each other and fill in the cracks when the coating is rolled or calendered. It has been found that the "mud cracks" are not closed if heated at 621° F. or higher without previous calendering, or if the calendering is carried out after heating at 621° F. or higher. It is also desirable that the calendering step be carried out below 621° F. and preferably below 600° F.

The following examples illustrate embodiments of this invention and are given by way of illustration only:

*Example 1*

A standard square-weave glass fabric, identified as Owens-Corning Fiberglas Corporation's ECC-11-108 and having the following specifications:

| | |
|---|---|
| Thickness ............................mils.. | 2 |
| Yarn size........................... | 900–½ |
| Thread count........................ | 60 x 47 |
| Ounces per square yard............. | 1.43 | was given three dip coats of a suspensoid of the following composition:

| | Per cent by weight |
|---|---|
| Finely divided polytetrafluoroethylene......... | 50 |
| Octyl phenyl polyglycol ether................. | 4 |
| Water ....................................... | 46 |

After each successive dip coat, the coated glass fabric was passed through a heated tower in which the air temperature was 300–400° F. This temperature evaporated the water and caused the polymeric particles to adhere to themselves and to the glass fabric sufficiently to permit the coated fabric to be wound on a 3-inch diameter shell, but the coating contained numerous "mud cracks." The weight of the dry coating deposited in the three dip coats was 3.5 ounces per square yard, and the average total thickness of the dry coated fabric was 4.48 mils.

The coated fabric was then heated for one minute at 540–560° F. After this heat treatment, the coating cracked when sharply creased and the "mud cracks" were still present.

The coated fabric was cut into five pieces, four of which were given 1, 2, 3, and 4 passes, respectively, through smooth, heated (275–300° F.) pressure rolls (40 tons pressure on the 60-inch axis). The second piece was calendered once on each side; the third piece was alternately calendered once on one side and twice on the other; the fourth piece was alternately calendered twice on each side.

These four pieces of coated fabric, and the additional uncalendered piece, were then subjected to an air temperature of 700–800° F. for one minute, thus fusing the coating.

The following table indicates the effect of the calendering operation on the dielectric strength of the coated glass fabric:

| Number of Times Calendered | Average thickness after calendering and final heating | Dielectric Strength (Volts per mil) | | |
|---|---|---|---|---|
| | | Min. | Max. | Average of 20 readings |
| | Mils | | | |
| 0 (Control)............. | 4.21 | 143 | 380 | 210 |
| 1...................... | 3.32 | 150 | 905 | 277 |
| 2...................... | 3.36 | 178 | 1,010 | 354 |
| 3...................... | 3.24 | 185 | 1,235 | 572 |
| 4...................... | 3.36 | 548 | 1,278 | 904 |

The dielectric strength test was carried out with a ¼-inch brass electrode in air, using the A. S. T. M. Designation D-149-44 Short-Time Test and a 60-cycle alternating current.

Example 2

A square-weave glass fabric, having the same specifications as that described in Example 1, was boiled in water containing a suitable wetting agent, rinsed, and dried, to remove any sizing. It was then dipped into a suspensoid of the following composition:

| | Per cent by weight |
|---|---|
| Finely divided polytetrafluoroethylene..... | 53.60 |
| Sodium salt of the sulphuric acid ester of a mixture of long chain alcohols (predominantly lauryl alcohol)................... | .54 |
| Water ....................................... | 45.90 |

The coated glass cloth was passed through rubber squeeze rolls to remove any excess coating and then passed through a drier having an air temperature of 300–350° F. to evaporate the water. On emergence from the drying oven, the interstices of the fabric were completely filled, but there was considerable "mud cracking" in the coating on both sides of the fabric.

The coated fabric was cut lengthwise into four strips, three of which were then passed 2, 4, and 6 times, respectively, on each side, through a hydraulic calender roller operating under a pressure of 50 tons applied on the axis and at a speed of 615 yards per hour. The top calender roll was steel and was heated at approximately 290° F.; the bottom roll was pressed paper. After each successive pass between the calender rolls, the degree of smoothness of the coating increased. After the second pass, the "mud cracks" had almost disappeared, and after the fourth pass, they were completely eliminated. All four strips were then subjected to an air temperature of approximately 750–770° F. for one minute, thus fusing the coating.

Example 3

Another length of coated glass fabric was prepared in the same manner as that described in Example 2, using the same fabric and coating composition, except that the fabric was given two dips into the coating composition with immediate drying after each dip. As in Example 2, the interstices of the fabric were completely filled, but there was a great amount of "mud cracking" in the coating on both sides of the fabric.

This coated fabric was also cut lengthwise into four strips, three of which were then calendered 2, 4, and 6 times, respectively, on each side, in the same hydraulic calender and under the same conditions as in Example 2. All four strips were then subjected to an air temperature of approximately 750–770° F. for one minute, thus fusing the coating.

The following data were obtained from the separate strips of each of these two examples:

| | Example 2 | | | | Example 3 | | | |
|---|---|---|---|---|---|---|---|---|
| Strip................. | A | B | C | D | A | B | C | D |
| Times calendered on each side........... | 0 | 2 | 4 | 6 | 0 | 2 | 4 | 6 |
| Final thickness (mils). | 3.4 | 3.0 | 3.0 | 3.0 | 4.3 | 3.7 | 3.7 | 3.7 |
| Interstices filled (Per Cent)................. | 100 | 100 | 100 | 100 | 100 | 100 | 100 | 100 |
| Surface smoothness... | fair | fair | good | good | poor | poor | good | good |
| Surface bubbles....... | few | few | none | none | few | few | none | none |
| Mud cracking......... | bad | slight | none | none | very bad | slight | none | none |
| Mullen hydrostatic resistance (pounds/ sq. in.)............... | 0 | 7 | 7 | 7 | 0 | 5 | 5 | 5 |

Example 4

A standard glass fabric, identified as Owens-Corning Fiberglas Corporation's ECC-11-106 and having the following specifications:

| | |
|---|---|
| Thickness | mils 1.5 |
| Yarn size | 900-1/0 |
| Individual filaments per yarn | 102 |
| Yarn diameter | mils 1.47 |
| Thread count | 56 x 56 |
| Ounces per square yard | .7 | was coated with three dip coats of a suspended of the following composition:

| | Per cent by weight |
|---|---|
| Finely divided polytetrafluoroethylene | 40.0 |
| Sodium salt of the sulphuric acid ester of a mixture of long chain alcohols (predominantly lauryl alcohol) | .4 |
| Water | 59.6 |

After each successive dip, the coated glass fabric was passed through a heated tower in which the air temperature was about 220° F. This temperature evaporated the suspending medium and caused the polymeric particles to adhere to themselves and to the glass fabric sufficiently to permit the coated fabric to be wound on rolls. Enough suspensoid was applied to the glass fabric in the three dip coats to deposit 3.1 ounces of non-volatile material per square yard. During the drying operations, the coating developed microscopic "mud cracks."

The coated cloth was then passed through a heat zone having an air temperature of approximately 540° F. and then passed twice through heated pressure rolls, first one side and then the other side up, to smooth the coating, seal the "mud cracks," and enhance the adhesion of the coating to the glass fabric. The pressure rolls were similar to those previously described and were heated at approximately 290° F.

The coated fabric was then subjected to an air temperature of approximately 750–770° F. for one minute, thus fusing the coating.

The coated fabric was cut into ½-inch strips and used for wrapping electrical conductors. The narrow strips were satisfactorily employed in mechanical wire wrapping equipment; the tape did not stretch or wrinkle during the wrapping operations.

The polytetrafluoroethylene coated glass fabric was tested for dielectric strength using the A. S. T. M. Designation D–149–44 Short-Time Test in air and a 60-cycle alternating current. It had a resistance of 293 volts per mil thickness when a 1-inch brass electrode was used and 388 volts per mil thickness using a ¼-inch brass electrode.

In the preferred embodiment (Example 1), the coated glass fabric was heated in two steps prior to calendering between heated pressure rolls. The first heating was carried out immediately after each coating was deposited on the fabric and at a relatively low temperature (300–400° F.) so that the water was removed at a rate which did not cause bubbling or the formation of pinholes in the coating. It has also been found that, if a coating of polytetrafluoroethylene has been heated at a temperature approaching the fusion temperature, any subsequent coating will not readily wet the dry coat and the build-up of non-volatile material per coat is much less than where the previous coat has been dried at the relatively low temperature. The second heating (at 540–560° F.) is desirable, since it enhances the mechanical strength of the coating, facilitating winding on rolls prior to and during the calendering operation without fracturing or stripping the coating. The temperature used in this second heating must be high enough to cause partial coalescence of the polymer particles to form a film of low mechanical strength, but it must be kept substantially below the fusion temperature of the polytetrafluoroethylene, since it is impossible to close the "mud cracks" by the subsequent calendering operation if the coating has been heated at a temperature approaching the solid-phase transition or fusion temperature of the polymer.

However, it is within the scope of this invention to eliminate these two heating steps, and merely allow the coating to dry at room temperature, then calender, and finally heat the coating at the fusion temperature.

It will be obvious that copolymers of tetrafluoroethylene with one or more polymerizable organic compounds containing an ethylenic double bond, such as ethylene, vinyl chloride, vinylidene chloride, and alkyl esters of acrylic and methacrylic acids, may be used. However, when such copolymers are used in place of polytetrafluoroethylene, the fusion point of the polymeric material will be somewhat less than 621° F., and will be dependent on the proportion and fusion point of the modifying material or materials present. When a copolymer of the type described above is used in the practice of this invention, it is preferred to use a copolymer of tetrafluoroethylene and ethylene, and particularly one which contains from 60% to 85% tetrafluoroethylene and 40% to 15% ethylene.

The method of this invention is useful for coating or impregnating substrates other than the woven glass fabrics described above, such as non-woven glass fabric, woven and non-woven asbestos fabric, metal (woven wire) fabric, and flexible and rigid metal sheets, the only limitation being that the substrate must be able to withstand the high temperature required for the final fusing of the polytetrafluoroethylene. Glass fabrics are preferred because of their physical and electrical properties.

The polytetrafluoroethylene coated glass fabrics of this invention are highly useful in the electrical insulation field, as indicated in the above examples, particularly where high heat-resistant insulation is needed. The coated glass fabrics herein described are also useful for fabricating protective clothing, such as fire-fighting suits, as well as acid- and other chemical-resistant clothing. It will be obvious that these coated substrates are useful in many other fields.

It is apparent that many widely different embodiments of this invention can be made without departing from the spirit and scope thereof; and, therefore, it is not intended to be limited except as indicated in the appended claims.

I claim:

1. The process of coating an inorganic fabric with polytetrafluoroethylene which comprises applying a relatively thick coating of an aqueous suspensoid of polytetrafluoroethylene to the fabric, evaporating the aqueous medium with the resultant formation of "mud cracks" in the coating by heating to below the fusion temperature of the polytetrafluoroethylene, calendering the coated fabric on pressure rollers and below the fusion temperature of the polytetrafluoroethylene to close the "mud cracks," and heating the coated fabric to at least the fusion temperature of the polytetrafluoroethylene but below the temperature which will deleteriously affect the coated fabric.

2. The process of claim 1 in which the fabric is glass fabric.

3. The process of claim 1 in which the pressure rollers are heated at less than 600° F.

4. The process of coating an inorganic fabric with polytetrafluoroethylene which comprises applying a relatively thick coat of an aqueous suspensoid of polytetrafluoroethylene to the fabric, heating at 300–400° F. to evaporate the aqueous medium with the resultant formation of "mud cracks" in the coating, heating at 540–560° F. to partially coalesce the polytetrafluoroethylene particles, calendering on pressure rollers heated at 275–300° F. to close the "mud cracks," and subsequently heating at 700–800° F. for one minute.

5. The process of claim 4 in which the fabric is glass fabric.

6. A polytetrafluoroethylene impregnated glass fabric formed by the process of claim 1.

PHILIP FRANCIS SANDERS.

REFERENCES CITED

The following references are of record in the file of this patent:

UNITED STATES PATENTS

| Number | Name | Date |
|---|---|---|
| 2,307,783 | Malm | Jan. 12, 1943 |
| 2,335,930 | Freeland | Dec. 7, 1943 |
| 2,396,629 | Alfthan | Mar. 19, 1946 |
| 2,416,252 | Soday | Feb. 18, 1947 |
| 2,416,721 | Upson | Mar. 4, 1947 |
| 2,428,716 | McGill | Oct. 7, 1947 |
| 2,448,952 | Berry | Sept. 7, 1948 |

---

Certificate of Correction

Patent No. 2,539,329 January 23, 1951

PHILIP FRANCIS SANDERS

It is hereby certified that error appears in the printed specification of the above numbered patent requiring correction as follows:

Column 1, line 1, for "relales" read *relates*; line 29, for "suspenoids" read *suspensoids*; column 5, line 12, for the word "suspended" read *suspensoid*; and that the said Letters Patent should be read as corrected above, so that the same may conform to the record of the case in the Patent Office.

Signed and sealed this 3rd day of April, A. D. 1951.

[SEAL]

THOMAS F. MURPHY,
*Assistant Commissioner of Patents.*